United States Patent
Ruemmler et al.

(10) Patent No.: US 7,149,831 B2
(45) Date of Patent: Dec. 12, 2006

(54) BATCH PROCESSING OF INTERRUPTS

(75) Inventors: Christopher P. Ruemmler, Morgan Hill, CA (US); Matthew L. Fischer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 10/950,994

(22) Filed: Sep. 27, 2004

(65) Prior Publication Data

US 2006/0069833 A1 Mar. 30, 2006

(51) Int. Cl.
*G06F 13/24* (2006.01)

(52) U.S. Cl. ............... 710/260; 710/263; 710/264; 710/265; 710/266; 710/269

(58) Field of Classification Search ........ 710/260–266, 710/268, 269
See application file for complete search history.

(56) References Cited

U.S. PATENT DOCUMENTS 5,603,035 A * 2/1997 Erramoun et al. .......... 710/260
6,145,048 A * 11/2000 Klein .......................... 710/264
6,356,998 B1 * 3/2002 Roche ......................... 712/244
2003/0204655 A1 * 10/2003 Schmisseur et al. ........ 710/260

OTHER PUBLICATIONS

Definition of Interrupt Vector, Wikipedia.*
Definition of Itanium Microprocessor, Wikipedia.*
Intel Itanium Processor Family, Interrupt Architecture Guide, Mar. 2003.*

* cited by examiner

*Primary Examiner*—Khanh Dang

(57) ABSTRACT

A computer-implemented method for handling pending interrupt vectors of a pending interrupt list is disclosed. The method includes batch-reading the set of pending interrupt vectors into a working list of working interrupt vectors. The method also includes performing interrupt handling of the working interrupt vectors using an interrupt handling arrangement until the working list is empty. The interrupt handling process permits a first incoming interrupt vector that is received by the pending interrupt list after the batch reading to temporarily interrupt the performing interrupt handling of the working interrupt vectors and to be handled on a priority basis by the interrupt handling arrangement if a priority level of the first incoming interrupt vector is higher than a priority level of a first working interrupt vector being currently handled by the interrupt handling arrangement.

12 Claims, 5 Drawing Sheets

T0

T1

T2

T3

BATCH PROCESSING OF INTERRUPTS

BACKGROUND OF THE INVENTION

In the computer art, an interrupt, as is well known, is an asynchronous signal to the processor that requires the attention of the processor. If multiple interrupts are received simultaneously or if an interrupt is received while the processor is handling another interrupt, it is necessary to employ some type of interrupt handling algorithm to handle the competing interrupts.

In certain computer systems, interrupts are stored in a central control register upon receipt and handled according to their priority levels. In the central control register, the interrupts are sorted based on the interrupts' vector numbers. The processor then accesses the central control register and handles the interrupts starting with the interrupt having the highest vector number.

While an interrupt is being handled, it is possible that another arriving interrupt may have a higher priority and may need immediate attention by the processor. To handle these situations, interrupts are mapped into priority levels, and an interrupt that is mapped into a higher priority level is handled ahead of an interrupt that is mapped into a lower priority level. For example, interrupts with vector numbers in the range from 0–15 may be mapped into priority level 1. Interrupts with vector numbers in the range from 48–63 may be mapped into priority level 4, and interrupts with vector numbers in the range from 64–79 may be mapped into priority level 5. A task priority register (TPR) keeps track of the priority level associated with the interrupt currently being handled by the processor.

If the processor is servicing an interrupt with a vector number that maps into a particular TPR value, the arrival of another interrupt would be ignored by the processor unless the priority level associated with the newly arriving interrupt is higher than the priority level represented in the TPR. For example, if the processor is currently servicing an interrupt having an interrupt vector of 47 (which maps into priority level 4), the current TPR value would be 4. Any subsequently arriving interrupt, such as an interrupt having a vector value of 11, would be ignored since such subsequently arriving interrupt maps into priority level 1, i.e., a lower priority level than that represents by the current TPR value of 4. On the other hand, a subsequently arriving interrupt having a vector value of 77 would be able to jump ahead of the line and get the processor's attention since an interrupt vector value of 77 maps into priority level 5, i.e., a priority level higher than that represented by the current TPR value of 4.

As mentioned, the interrupts are stored in a central control register while they wait to be handled by the processor. In the IPF® (Itanium Processor Family) family of processors, which is available from the Intel Corporation of Santa Clara, Calif., an IVR register is employed to store the received interrupts. As each interrupt is received, it is sorted and stored in the IVR register. The processor then process the received interrupts in the IVR register in accordance with some interrupt handling algorithm, starting with the interrupt having the highest vector number.

FIG. 1 shows a prior art implementation whereby an algorithm has been implemented to manage pending interrupts in a computer system that employs the IPF architecture. Generally speaking, as an interrupt is taken from the IVR register to be handled, the TPR level is masked to the priority level associated with the interrupt that is about to be handled. For example, if the TPR level has been 0, e.g., the processor has not been servicing any interrupt, the TPR level will be set to 5 if an interrupt having an interrupt vector number of 77 is taken from the IVR to be handled next. This is because, as mentioned, the vector value of 77 maps into priority level 5.

The processor then handles the interrupt whose interrupt vector number is 77. Since the TPR level is set to 5, the processor will ignore all incoming interrupts whose priority level is 5 or lower. Assuming no higher level interrupt is received, the processor will finish servicing the interrupt that has the vector number of 77, and returns to the previous TPR level (i.e., zero in the present example). At this point, with the TPR lowered again, the processor can access all interrupts irrespective of their vector numbers. The processor then accesses the IVR register to ascertain the highest priority interrupt in the IVR to handle next. If the interrupt that has the highest vector number in the IVR is now 8 (which maps into priority level 1 per the present example), the fact that the TPR has been restored to its previous value (i.e., zero in this example) allows the processor to take note of this interrupt. The process then reads the interrupt with the highest vector number in the IVR, handles that interrupt, and continues in this manner until all pending interrupts are handled.

The sequence described above is illustrated in FIG. 1. Referring now to FIG. 1, in step 102, the interrupt in the IVR that has the highest vector number is ascertained. This is the interrupt to be handled next. In step 104, the TPR level is set to the priority level associated with the vector number of the interrupt about to be handled. This setting of the TPR level, as mentioned, enables a subsequently received interrupt having a higher priority level than the priority level of the interrupt about to be handled to immediately get the attention of the processor even while the processor is busy handling interrupts. Any subsequently received interrupt having the same priority level or a lower priority level than the priority level of the interrupt being handled will be ignored by the processor while it is servicing the current interrupt. On the other hand, any subsequently received interrupt having a higher priority level than the priority level of the interrupt being handled will be able to get the attention of the processor In step 106, the interrupt mechanism is enabled. The enabling of the interrupt mechanism permits a higher priority interrupt that may be subsequently received to immediately get the attention of the processor. In step 108, the current interrupt is handled. After the interrupt is handled, the interrupt mechanism is disabled in step 110. In step 112, the processor signals that it has finished servicing the interrupt it has recently taken from the IVR by writing a value "0" (i.e., zero) into the control register EOI. Thereafter, the TPR value is reset to the original TPR value (e.g., zero in the current example) in step 114. In step 116, the next interrupt is read from the IVR. If the next interrupt is equal to the flag "spurious" (which is an arbitrary value selected to signal that there are no more pending interrupts in the IVR), the IVR is empty. In this case, the algorithm ends at step 120. On the other hand, if the next interrupt read from the IVR is not equal to the flag "spurious," the method returns to step 104 to reset the TPR value to the priority level associated with the vector number of the interrupt in the IVR that is to be serviced next (i.e., the interrupt that currently has the highest vector number in the IVR).

It has been found, however, that the prior art approach for handling pending interrupts has certain disadvantages. In particular, the prior art algorithm may result, in certain situations, an interrupt starvation condition for some interrupts. To facilitate discussion, consider the example of FIG. 2, which covers four time periods: T0, T1, T2, and T3. At time T0, the IVR 202 shows three interrupts, whose vector numbers are 77, 75, and 62 respectively. These may be sorted by their vector numbers in the IVR.

At time T0, the interrupt having the vector number of 77 is the one with the highest vector number in the IVR and is thus read and handled first (step 102 of FIG. 1). Assuming that prior to the handling of this interrupt, the processor is coming from a non-masked situation (i.e., it has not been handling any interrupt). Thus, the current TPR level is zero (step 102).

The TPR level is then set to 5 since the vector number of 77 maps into priority level 5 (step 104). The interrupt is then enabled (step 106). The processor then handles the interrupt (step 108). The interrupt is then disabled (step 110). Thereafter, the value "0" is written into the EOI control register (step 112). The TPR is restored to its previous value of "0" (step 114).

At time T1, the process then accesses the IVR to read the next interrupt vector (step 116). As can be seen, an interrupt vector number 76 has been received since time T0, and it is now sorted to be at the top of the pending interrupts list in the IVR. Since there are interrupts pending in the IVR, the new interrupt vector is not spurious. Accordingly, the method begins to service the next interrupt that it just read in (step 118 back to step 104).

The TPR level is then set to 5 since the vector number of 76 maps into priority level 5 (step 104). The interrupt is then enabled (step 106). The processor then handles the interrupt (step 108). The interrupt is then disabled (step 110). Thereafter, the value "0" is written into the EOI control register (step 112). The TPR is restored to its previous value of "0" (step 114).

At time T2, the process then accesses the IVR to read the next interrupt vector (step 116). As can be seen, an interrupt vector number 77 has been received again since time T1, and it is now sorted to be at the top of the pending interrupts list in the IVR. Since there are interrupts pending in the IVR, the new interrupt vector is not spurious. Accordingly, the method begins to service the next interrupt that it just read in (step 118 back to step 104).

The TPR level is then set to 5 since the vector number of 77 maps into priority level 5 (step 104). The interrupt is then enabled (step 106). The processor then handles the interrupt (step 108). The interrupt is then disabled (step 110). Thereafter, the value "0" is written into the EOI control register (step 112). The TPR is restored to its previous value of "0" (step 114).

At time T3, the process then accesses the IVR to read the next interrupt vector (step 116). As can be seen, an interrupt vector number 76 has been received again since time T1, and it is now sorted to be at the top of the pending interrupts list in the IVR. Since there are interrupts pending in the IVR, the new interrupt vector is not spurious. Accordingly, the method begins to service the next interrupt that it just read in (step 118 back to step 104).

The TPR level is then set to 5 since the vector number of 76 maps into priority level 5 (step 104). The interrupt is then enabled (step 106). The processor then handles the interrupt (step 108). The interrupt is then disabled (step 110). Thereafter, the value "0" is written into the EOI control register (step 112). The TPR is restored to its previous value of "0" (step 114).

Note also that even though interrupt vector 62 does not get handled in the current sequence, this is the correct result since interrupt vector 62 maps into priority level 4, and thus interrupt vector 62 cannot be serviced before interrupt vectors 77, 76, or 75 (which are all mapped to priority level 5) irrespective of how long it waits in the IVR.

However, interrupt vector 75 also does not get handled even though it has the same priority level as interrupt vector 77 and interrupt vector 76, both of which have been able to jump ahead of interrupt vector 75. In other words, interrupt vector 75 is unfairly starved even though it is at the same priority level as interrupt vector 77 and interrupt vector 76 and thus should not be trumped by interrupt vector 77 and interrupt vector 76.

SUMMARY OF INVENTION

The invention relates, in an embodiment, to a computer-implemented method for handling pending interrupt vectors of a pending interrupt list. The method includes batch-reading the set of pending interrupt vectors into a working list of working interrupt vectors. The method also includes performing interrupt handling of the working interrupt vectors using an interrupt handling arrangement until the working list is empty. The interrupt handling process permits a first incoming interrupt vector that is received by the pending interrupt list after the batch reading to temporarily interrupt the performing interrupt handling of the working interrupt vectors and to be handled on a priority basis by the interrupt handling arrangement if a priority level of the first incoming interrupt vector is higher than a priority level of a first working interrupt vector being currently handled by the interrupt handling arrangement.

In another embodiment, the invention relates to a processor having circuitry for handling pending interrupt vectors of a pending interrupt list. The processor includes first logic circuitry for batch-reading the set of pending interrupt vectors into a working list of working interrupt vectors. The processor also includes an interrupt handling circuitry for performing interrupt handling of the working interrupt vectors. The handling of the working interrupt vectors is performed until the working list is empty before additional pending interrupt vectors from the pending interrupt list is read into the working list again. However, the interrupt handling process permits a first incoming interrupt vector that is received by the pending interrupt list after the batch reading to temporarily interrupt the performing interrupt handling of the working interrupt vectors and to be handled on a priority basis by the interrupt handling circuitry if a priority level of the first incoming interrupt vector is higher than a priority level of a first working interrupt vector being currently handled by the interrupt handling circuitry.

In yet another embodiment, the invention relates to a processor configured to handle pending interrupt vectors of a pending interrupt list. The processor includes first means for batch-reading the set of pending interrupt vectors into a working list of working interrupt vectors. The processor also includes second means for performing interrupt handling of the working interrupt vectors, the handling of the working interrupt vectors is performed until the working list is empty before incoming interrupt vectors received after the batch-reading in the pending interrupt list is handled, except that a first incoming interrupt vector that is received in the pending interrupt list after the batch reading is permitted to temporarily interrupt the performing interrupt handling of the working interrupt vectors and to be handled on a priority basis by the second means if a priority level of the first incoming interrupt vector is higher than a priority level of a first working interrupt vector being currently handled by the second means.

In yet another embodiment, the invention relates to a computer-implemented method for handling pending interrupt vectors of a pending interrupt list. The method includes batch-reading all currently pending interrupt vectors into a working list of working interrupt vectors. The method also includes performing interrupt handling of the working interrupt vectors using an interrupt handling arrangement until the working list is empty. The performing interrupt handling of the working interrupt vectors includes handling the working interrupt vectors in descending order staring with a working interrupt vector having a highest priority vector number. The performing interrupt handling of the working interrupt vectors further includes temporarily suspending, if a first incoming interrupt vector having a priority level that is higher than a priority level associated with a priority level of a first working interrupt vector being currently handled by the interrupt handling arrangement is received in the pending interrupt list after the batch-reading, the handling the working interrupt vectors to handle the first incoming interrupt vector on a priority basis. There is further included resuming the handling the working interrupt vectors after the first incoming interrupt vector is handled.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
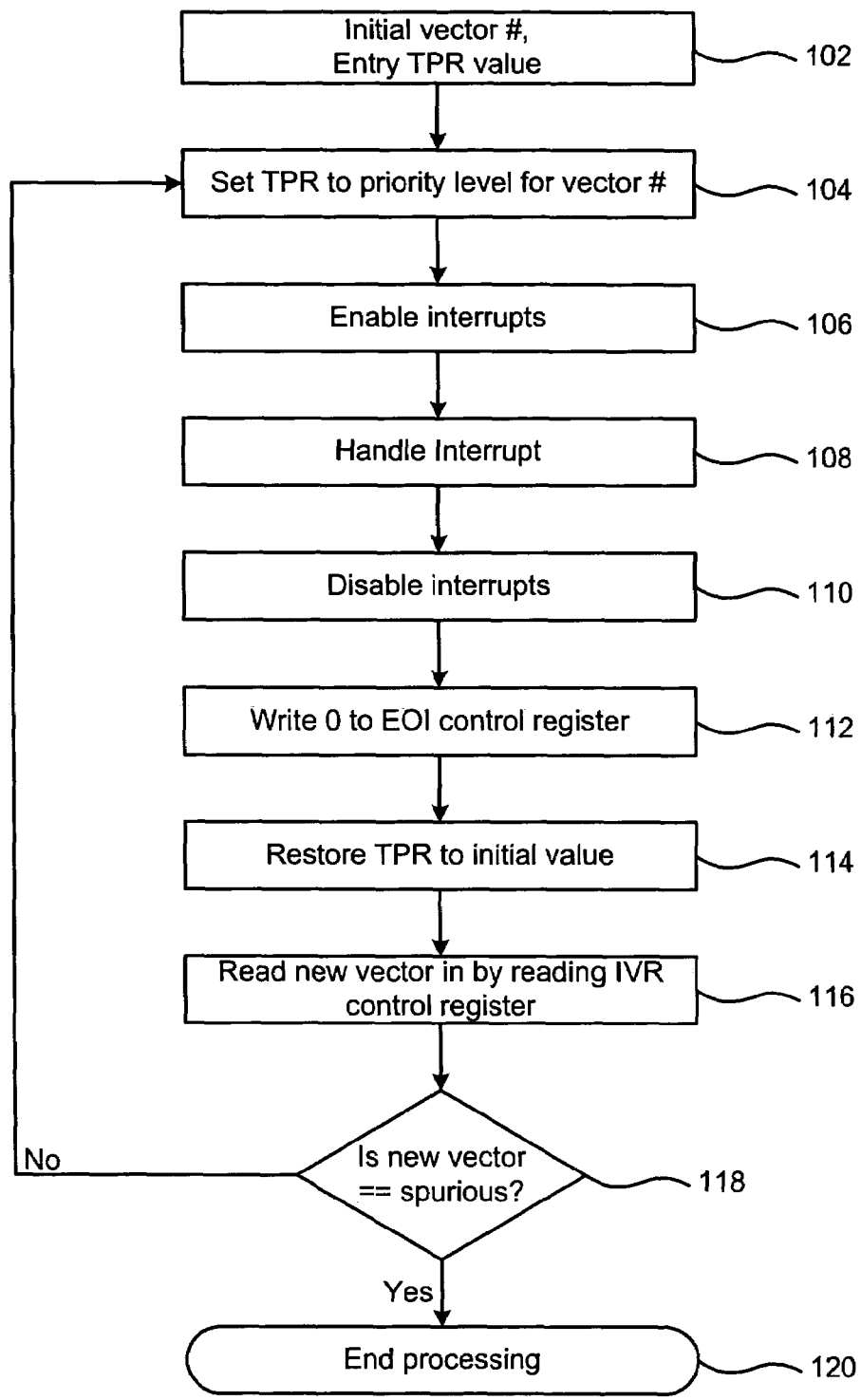
FIG. 1 shows a prior art implementation whereby an algorithm has been implemented to manage pending interrupts in a computer system that employs the IPF architecture.
Figure 2:
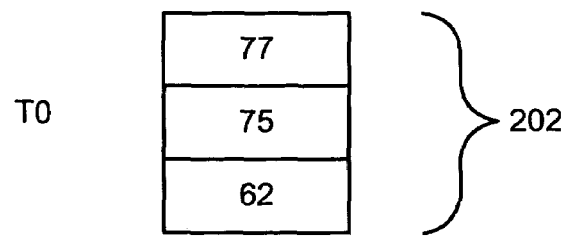
FIG. 2 is an example to facilitate understanding of the algorithm of FIG. 1.
Figure 2:
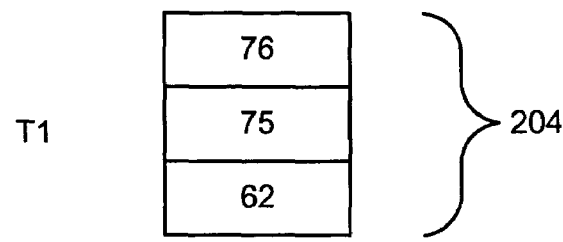
Figure 2:
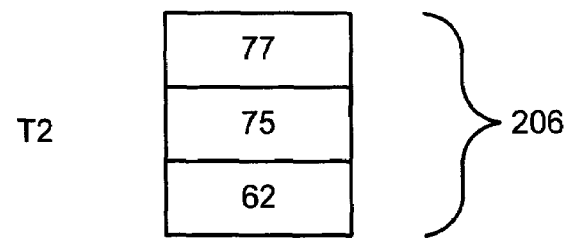
Figure 2:
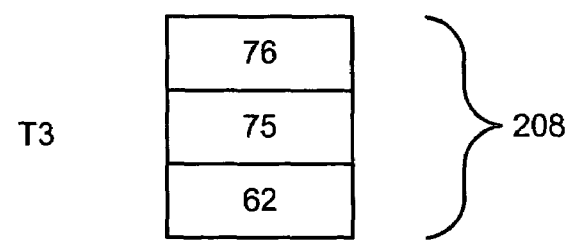

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention. Examples of such apparatus may include appropriate dedicated and/or programmable circuitry in one or more integrated circuits configured to carry out the computer-implemented techniques disclosed herein.

In accordance with embodiments of the present invention, all pending interrupts in the pending interrupt list (e.g., the central control register or the IVR) is read as a batch into a working list. The interrupt handler then handles all the working list interrupts in the working list until they are exhausted. While the interrupts in the working list are handled, the interrupt masking mechanism that allows a higher priority interrupts to jump ahead is still enabled to allow interrupt handling of higher priority interrupt to be correctly performed. After the interrupts in the working list are exhausted, the interrupt handler returns to the central control register (e.g., the IVR) and reads in the next batch, if there are any interrupts pending then. The process continues until all pending interrupts in the IVR are handled.

In this manner, interrupts that map into the same priority level are assured of being handled after they are read into the working list without being starved by another interrupt that is mapped into the same priority level. This is because a subsequently received interrupt that maps into the same priority level would not be able to get the processor's attention to cause the processor to suspend work on the working list. If a higher priority interrupt is received while the interrupts in the working list are being worked on, the higher priority interrupt takes precedence and is handled on a priority basis. Thus, the mechanism for handling higher priority interrupts out of turn still performs correctly.

Once the interrupts in the working list are exhausted, the next batch is read in, and the process continues until there are no more pending interrupts in the IVR.

Figure 3A:
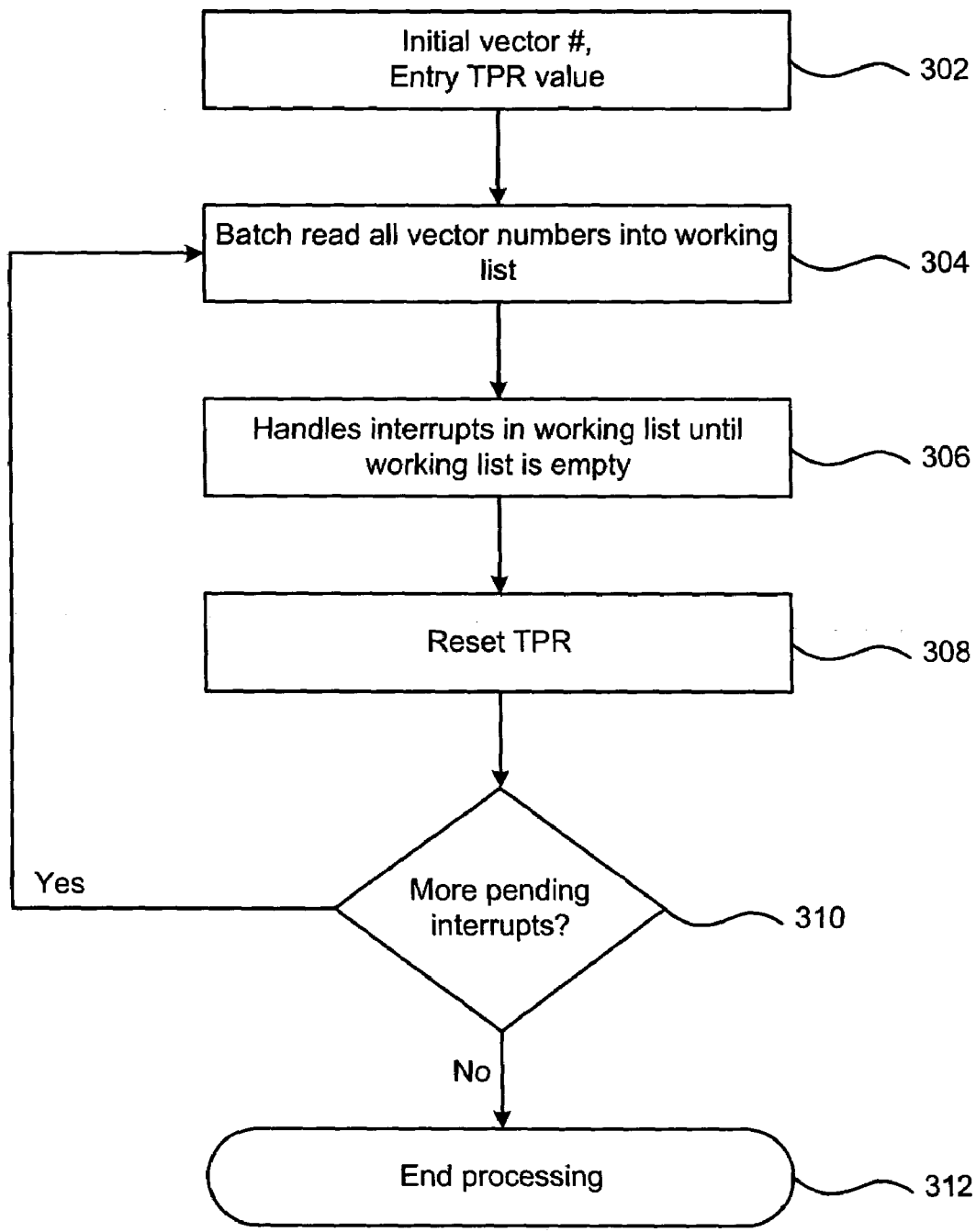
FIG. 3A shows, in accordance with an embodiment of the present invention, the steps for handling pending interrupts.

The features and advantages of the present invention may be better understood with reference to the figures and discussions that follow. FIG. 3A shows, in accordance with an embodiment of the present invention, the steps for handling pending interrupts. In step 302, the initial vector number of the first interrupt to be handled (i.e., the interrupt with the highest vector number in the IVR then) is ascertained. Further, the initial value of the TPR register (which holds the priority level of the interrupt being handled prior to step 302) is ascertained. Assuming that the processor comes from a non-masked state (i.e., it is not currently handling any interrupt), the initial TPR value is zero. Keep in mind, however, the initial TPR value may be different than zero in other situations if the processor has been currently handling another interrupt. This situation is shown later herein in the example of FIG. 4.

In step 304, all interrupt vectors pending in the pending interrupt list (e.g., the IVR) are read into a working list as a batch. This working list may be implemented in software and/or hardware, for example. Since the IVR typically presents a sorted list (the sorting is optional and interrupts could be received while the list is read, for example), the working list is generally sorted although whether the interrupt vectors in the IVR are sorted is not mandatory at this point. In step 306, the interrupt handler handles all working list interrupt vectors in the working list until the working list is finished. During this time, the normal interrupt masking mechanism of allowing a higher priority level incoming interrupt to take precedence. On the other hand, incoming interrupts that are mapped to the same priority level or a lower priority level as the interrupt being handled from the working list is held off in the IVR. This is done in an embodiment by setting the TPR value to the priority level associated with the working list interrupt vector being handled.

In step 308, the interrupts in the working list are exhausted (i.e., all handled), and TPR value is reset to the original TPR value in order to allow the interrupt handler to access all interrupts pending in the IVR. If there are more pending interrupts in the IVR, the process returns to step 304 to read in another batch of interrupts into the working list (step 310). On the other hand, if the IVR is empty, the process of handling pending interrupts ends (step 310 to step 312).

Figure 3B:
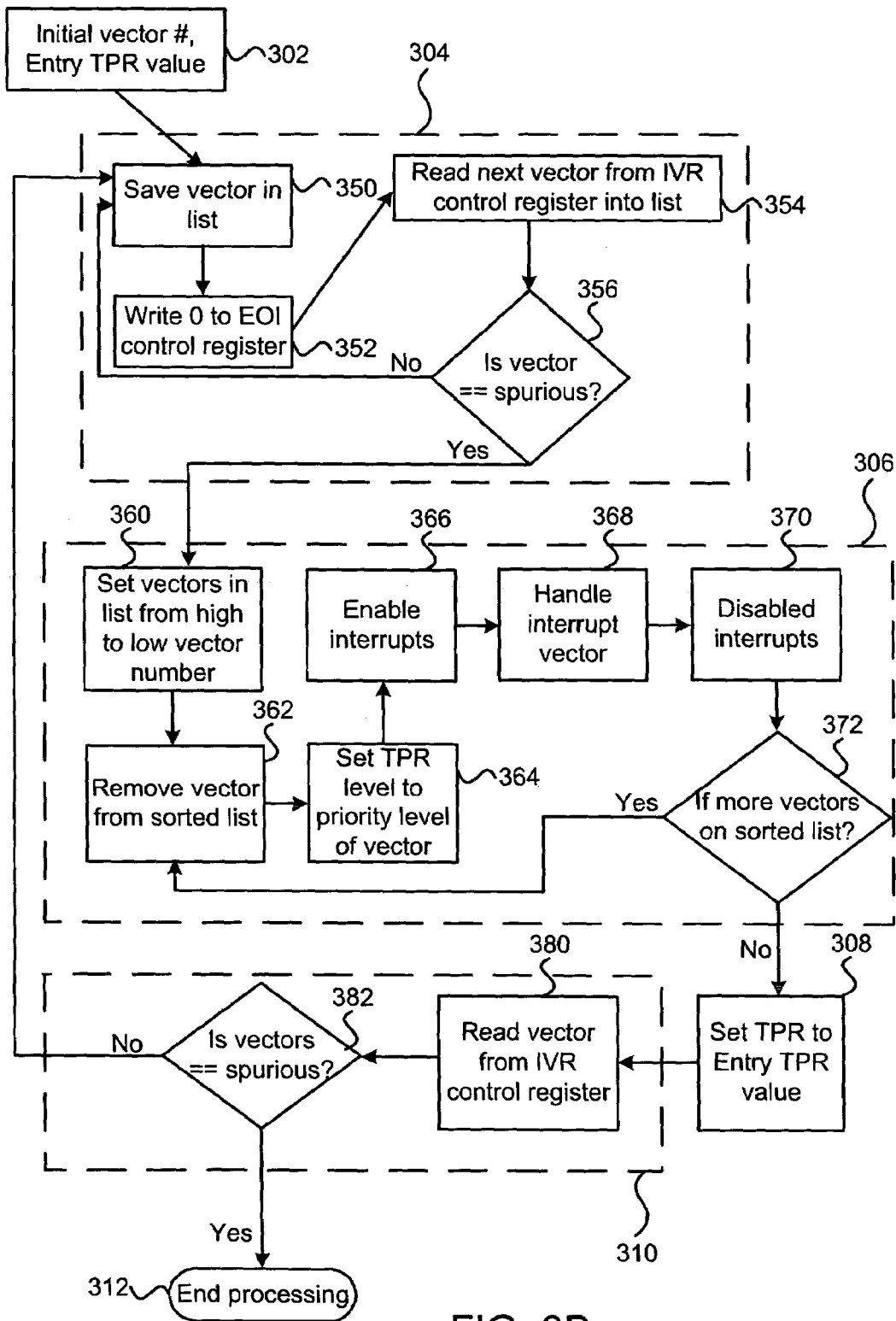
FIG. 3B shows, in accordance with an implementation of FIG. 3A, the steps of handling interrupts pending in the central control register IVR.

FIG. 3B shows, in accordance with an implementation of FIG. 3A, the steps of handling interrupts pending in the central control register IVR. In step 302, the initial vector number of the first interrupt to be handled (i.e., the interrupt with the highest vector number in the IVR then) is ascertained. Further, the initial value of the TPR register (which holds the priority level of the interrupt being handled prior to step 302) is ascertained.

In step 304, all interrupt vectors in the IVR are read into a working list as a batch. In the implementation of FIG. 3B, this step 304 includes four steps: 350, 352, 354, and 356. In step 350, the interrupt vector read in step 302 is saved into the working list. In step 352, the value "0" is written into the EOI control register to signal that the recently read interrupt vector has been "handled." Note that in reality, this interrupt vector has only been saved into the working list. Nevertheless, the writing of the value "0" into the EOI register enables the interrupt handler to access the IVR to read in the next interrupt vector. This action is taken in the next step 354. In step 356, it is ascertained whether the interrupt vector that is just read is equal to the flag "spurious." As mentioned, this flag indicates that the pending list in the IVR is empty, in an embodiment. If the pending list is not empty, the method returns to step 350 to continue reading in the pending interrupts in the IVR until the pending list in the IVR is empty.

In step 306, the interrupt handler handles all interrupts in the working list until the working list is finished. In the implementation of FIG. 3B, step 306 includes 7 steps: 360, 362, 364, 366, 368, 370, and 372. In step 360, the interrupt vectors in the working list are sorted from high to low by their vector numbers in an embodiment. In another embodiment, step 360 may be alternatively implemented by a push-back approach. If a lower level interrupt is being serviced and the next interrupt is a higher level interrupt, the higher level interrupt will be sent back to the CPU in order to preempt the servicing of the lower level interrupt. For example, if TPR level 3 is being serviced and the next interrupt is associated with TPR level 5, the next interrupt having TPR level 5 will be sent back to the CPU to preempt the handling of the list at TPR level 3. The present discussion will focus on a sorted list although implementing the disclosed interrupt handling techniques using a push-back approach can be readily understood by one skilled in the art in view of the disclosure herein.

In step 362, the first interrupt vector is removed from the working list for handling in descending order according to their vector numbers. Since the list is sorted, this naturally corresponds to the interrupt vector that has the highest vector number in the working list. In step 364, the TPR level is set to the priority level of the interrupt vector about to be handled. In step 366, the interrupt masking mechanism is enabled. In step 368, the interrupt vector removed from the working list in step 362 is handled. After the interrupt vector that was removed from the working list in step 362 is handled, the interrupt masking mechanism is disabled in step 370. If there are more interrupt vectors in the working list, the method returns to step 362 to remove the interrupt vector with the then-highest interrupt vector number from the working list (step 372 to step 362). The process continues until all interrupt vectors in the working list are exhausted.

Note that during step 306 (i.e., during the handling of the interrupt vectors of the working list), if an interrupt vector that maps into a higher priority level than the priority level associated with the interrupt vector being handled is received, that incoming interrupt vector will be able to take precedence. After that incoming interrupt vector is serviced, the method returns to the working list to finish up the working list. On the other hand, incoming interrupts that are mapped to the same priority level or a lower priority level are held off in the IVR.

In step 308, the working list is exhausted and the TPR value is reset to its initial value (which was ascertained in step 302) in order to allow the interrupt handler to access all pending interrupts (if any) in the IVR. In step 310, it is ascertained whether there are any pending interrupts in the IVR. In the implementation of FIG. 3B, this step 310 includes step 380 (reading in the next interrupt vector from the IVR), and step 382 (ascertaining whether the read interrupt vector is the flag that signals an empty pending list in the IVR). If there are no more pending interrupt vectors in the IVR, the method proceeds to step 312 wherein the steps for handling IVR pending interrupts are completed. On the other hand, if there are pending interrupts in the IVR, the method returns to step 350 from step 310/382 to read in the next batch.

Figure 4:
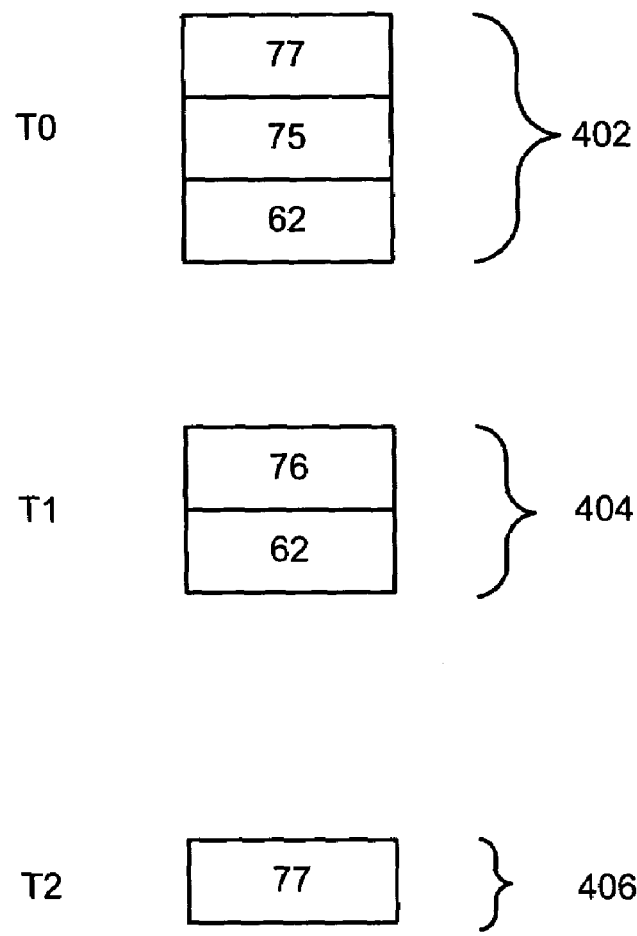
FIG. 4 is an example to facilitate understanding of the algorithm of FIG. 3B.

The operation of FIG. 3B may be more clearly understood with reference to an example. FIG. 4 shows an example of the operation of FIG. 3B. FIG. 4 covers three time periods: T0, T1, and T2. At time T0, the IVR 402 shows three interrupts, whose vector numbers are 77, 75, and 62 respectively. These are sorted by their vector numbers in the IVR as mentioned.

At time T0, the interrupt having the vector number of 77 is the one with the highest vector number in the IVR and is read in to the list (step 350). Assuming that prior to the handling of this interrupt, the processor is coming from a non-masked situation (i.e., it has not been handling any interrupt). Thus, the current TPR level is zero (step 302).

The value "0" is then written into the EOI register (step 352), and the next interrupt vector 75 is read. The working list now has two members: interrupt vector 77 and interrupt vector 75. Suppose that in the mean time, an interrupt vector 76 is received before the pending list in the IVR is all read. The incoming interrupt vector is sorted in the IVR and is thus placed higher in the pending list than interrupt vector 62, which has been pending in the pending list in the IVR. Thus, the IVR pending list at this point has two members: interrupt vector 76, which is just received, and interrupt vector 62, which has been pending.

This situation is shown at time T1. At time T1, the next interrupt vector from the IVR pending list is read (step 354). The working list now has three members: interrupt vector 77, interrupt vector 75, and interrupt vector 76. Assuming no other interrupt vector is received, the last pending interrupt vector in the IVR pending list is interrupt vector 62. It is then read into the working list (step 356 to step 354). After interrupt vector 62 is read, the pending list in the IVR is empty. Thus, the batch read routine is finished (step 354 to step 356 and exiting via path "YES"). After the batch read routine is finished, the working list has four members: interrupt vector 77, interrupt vector 75, interrupt vector 76, and interrupt vector 62.

In step 360, the interrupt vectors in the working list are sorted. Thus, the interrupt vectors in the working list now have the following order: interrupt vector 77, interrupt vector 76, interrupt vector 75, and interrupt vector 62.

In step 362, the first interrupt vector in the working list is removed for handling. This corresponds to interrupt vector 77 of the working list. Thus the working list now has three members remaining: interrupt vector 76, interrupt vector 75, and interrupt vector 62.

In step 364, the TPR level is set to the priority level of the interrupt vector about to be handled (i.e., interrupt vector 77). Since interrupt vector 77 maps into priority level 5, the TPR level is set to 5.

In step 366, the interrupt handling mechanism is then enabled. The processor then handles the interrupt vector 77 (step 368). The interrupt handling mechanism is then disabled (step 370).

After interrupt vector 77 is handled, the method ascertains in step 372 whether there are any more remaining interrupt vectors in the working list. Since the working list still has three interrupt vectors (interrupt vector 76, interrupt vector 75, and interrupt vector 62), the method returns from step 372 to step 362 to handle the next interrupt vector in the working list.

In step 362, the interrupt vector in the working list having the then-highest vector number is removed for handling. This corresponds to interrupt vector 76 of the working list. Thus the working list now has two members remaining: interrupt vector 75, and interrupt vector 62.

In step 364, the TPR level is set to the priority level of the interrupt vector about to be handled (i.e., interrupt vector 76). Since interrupt vector 76 maps into priority level 5, the TPR level is set to 5.

In step 366, the interrupt handling mechanism is then enabled. The processor then handles the interrupt vector 76 (step 368). The interrupt handling mechanism is then disabled (step 370).

After interrupt vector 76 is handled, the method ascertains in step 372 whether there are any more remaining interrupt vectors in the working list. Since the working list still has two interrupt vectors (interrupt vector 75, and interrupt vector 62), the method returns from step 372 to step 362 to handle the next interrupt vector in the working list.

In step 362, the interrupt vector in the working list having the then-highest vector number is removed for handling. This corresponds to interrupt vector 75 of the working list. Thus the working list now has one member remaining: interrupt vector 62.

In step 364, the TPR level is set to the priority level of the interrupt vector about to be handled (i.e., interrupt vector 75). Since interrupt vector 75 maps into priority level 5, the TPR level is set to 5.

In step 366, the interrupt handling mechanism is then enabled. The processor then handles the interrupt vector 75 (step 368). The interrupt handling mechanism is then disabled (step 370).

Note that up to now, if an interrupt having a vector number 77 had been received again, its priority level (i.e., 5) would not have allowed it to take precedence over the handling of interrupt vectors 76 and 75. This is unlike the situation in the prior art wherein the receipt of vector number 77 would have caused vector number 76 and vector numbers 75 to be deferred even though vector numbers 77, 76, and 75 all map into the same priority level (i.e., 5). Instead, vector number 77 is held in the IVR until the time when the priority level associated with the interrupt vector currently handled is lower than the priority level associated with vector number 77.

This situation is shown at time T2. Some time before time T2, interrupt vector 77 is received again. Irrespective of when interrupt vector 77 is received (assuming that it is received after the batch read), it could not take precedence over the handling of interrupt vectors 76 and 75 as discussed earlier. However, as the next interrupt vector 62 is removed from the working list (step 362) and the TPR level is set to 4 (since interrupt vector number 62 maps to priority level 4), the enabling of the interrupt mechanism in step 366 causes the processor to realize that there is an interrupt pending in the IVR pending list that has a higher priority level (i.e., interrupt vector 77 with priority level 5) than the priority level of the interrupt vector about to be handled (i.e., interrupt vector 62 with priority level 4).

At this time, the interrupt masking mechanism operates to allow interrupt vector 77 to be handled out of turn.

The handling of the current working list is suspended and a call is made to the interrupt-handling routine to handle this interrupt vector 77. Thus, starting from step 302 again, the initial vector number is 77 and the current TPR level is 4 (i.e., the then-existing TPR level). The vector number 77 is written into the newly-created working list. At this level, the newly-created working list only has one member, i.e., interrupt vector 77). Note that there are two working list: the suspended working list that has interrupt vector 62 and the newly created working list that has interrupt vector 77. The newly created working list is worked on until the method pops out of this routine to resume working on the suspended working list again.

The value "0" is then written into the EOI register (step 352), and the next interrupt vector is read. Since there are no more pending interrupt vectors in the IVR, the read interrupt vector is spurious (step 356), and the method proceeds to step 310 to sort the current working list.

Since the current working list has only one member (interrupt vector 77), no change is made to the working list after sorting. In step 362, the interrupt vector in the working list having the highest vector number is removed for handling. This corresponds to interrupt vector 77 (i.e., the only interrupt vector) of the current working list. Thus the current working list is now empty.

In step 364, the TPR level is set to the priority level of the interrupt vector about to be handled (i.e., interrupt vector 77). Since interrupt vector 77 maps into priority level 5, the TPR level is set to 5.

In step 366, the interrupt handling mechanism is then enabled. The processor then handles interrupt vector 77 (step 368). The interrupt handling mechanism is then disabled (step 370).

After interrupt vector 77 is handled, the method ascertains in step 372 whether there are any more remaining interrupt vectors in the current working list. Since the current working list is empty, the method proceeds from step 372 to step 308 to set to TPR value to the TPR value that existed when it entered this routine after suspending the handling of interrupt vector 62. Thus, the TPR value is reset to TPR value 4.

In step 380, the next interrupt vector is read from the IVR. Since the IVR is empty (step 382), the method proceeds to from step 382 to step 312 wherein the current routine that handles the out-of-turn interrupt vector 77 ends. At this point, the method resumes handling interrupt vector 62, which was suspended to facilitate handling the higher priority incoming interrupt vector 77.

Resuming at step 368, interrupt vector 62 is handled. After handling interrupt vector 62, the interrupt mechanism is disabled. At this point, the original working list that had at one point in time interrupt vectors 77, 76, 75, and 62 is exhausted (step 372). Thus the method proceeds to step 308 to set the TPR to the initial TPR level (i.e., TPR level zero). In steps 380 and 382, it is ascertained that the pending list in the IVR is also empty. Thus interrupt handling is accomplished and the method exits at step 312.

As can be appreciated from the foregoing, the method prevents incoming vectors that map into the same priority level from starving other vectors that also map into the same priority level. In the example of FIG. 4, interrupt vector 75 can be handled although interrupt vector 77 may have been received again before interrupt vector 75 is handled from the working list. In other words, the arrival of interrupt vector 77 did not cause the handling of interrupt vector 75 to be deferred.

Note that incoming interrupt vectors that have a lower priority level is still deferred like before. Also note that since the TPR is reset and the interrupt masking mechanism is enabled each time an interrupt vector from the working list is handled, it is still possible for an incoming interrupt vector that is associated with a higher priority level to take precedence. In this manner, there is fairness among interrupt vectors associated with the same priority level, and the interrupt handling mechanism still operates correctly for incoming interrupt vectors having a higher priority level and for incoming interrupt vectors having the same or a lower priority level.

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method in a processor for handling pending interrupt vectors of a pending interrupt list, comprising:
   batch-reading, using said processor, said pending interrupt vectors into a working list of working list interrupt vectors; and
   performing, using said processor, interrupt handling of said working list interrupt vectors using an interrupt handling arrangement until said working list is empty, said performing interrupt handling permitting a first incoming interrupt vector that is received by said pending interrupt list after said batch reading to temporarily interrupt said performing interrupt handling of said working list interrupt vectors and to be handled by said processor on a priority basis by said interrupt handling arrangement if a priority level of said first incoming interrupt vector is higher than a priority level of a first working list interrupt vector being currently handled by said interrupt handling arrangement.

2. The computer-implemented method of claim 1 wherein said performing interrupt handling is performed in accordance with a descending order starting with a working list interrupt vector having a highest priority vector number.

3. The computer-implemented method of claim 2 wherein a second incoming interrupt vector that is received by said pending interrupt list after said batch reading is kept in said pending list without being read into said working list for handling by said interrupt handling arrangement if a priority level of said second incoming interrupt vector is equal to said priority level of said first working list interrupt vector being currently handled by said interrupt handling arrangement.

4. The computer-implemented method of claim 2 wherein a second incoming interrupt vector that is received by said pending interrupt list after said batch reading is kept in said pending list without being read into said working list for handling by said interrupt handling arrangement if a priority level of said second incoming interrupt vector is lower than said priority level of said first working list interrupt vector being currently handled by said interrupt handling arrangement.

5. The computer-implemented method of claim 2 further comprising reading a first current priority level value from a first memory location and storing said first current priority level value in a second memory location prior to said batch-reading, said first current priority level tracking a priority level of an interrupt vector handled by said interrupt handling arrangement prior to said batch-reading.

6. The computer-implemented method of claim 5 further comprising restoring said first current priority level value to said first memory location after said working list is exhausted.

7. The computer-implemented method of claim 6 wherein said first memory location represents a task priority register (TPR) of a processor associated with the Itanium® architecture, said pending list represents an IVR control register of said processor.

8. A computer-implemented method in a processor for handling pending interrupt vectors of a pending interrupt list, comprising:
   batch-reading, using said processor, all currently pending interrupt vectors into a working list of working list interrupt vectors; and
   performing, using said processor, interrupt handling of said working list interrupt vectors using an interrupt handling arrangement until said working list is empty, including
      handling said working list interrupt vectors in descending order staring with a working list interrupt vector having a highest priority vector number,
      if a first incoming interrupt vector having a priority level that is higher than a priority level associated with a priority level of a first working list interrupt vector being currently handled by said interrupt handling arrangement is received in said pending interrupt list after said batch-reading, temporarily suspending said handling said working list interrupt vectors to handle, using said processor, said first incoming interrupt vector on a priority basis, and
      resuming said handling said working list interrupt vectors after said first
      incoming interrupt vector is handled.

9. The computer-implemented method of claim 8 further comprising performing another batch-reading, after said working list is exhausted, of pending interrupt vectors that are held in said pending list while said working list is handled.

10. The computer-implemented method of claim 8 further comprising:
   if a second incoming interrupt vector having a priority level that is equal to a priority level associated with a priority level of a first working list interrupt vector being currently handled by said interrupt handling arrangement is received in said pending interrupt list after said batch-reading, keeping said second incoming interrupt vector from being handled by said interrupt handling arrangement at least until all working list interrupt vectors having said priority level of said first working list interrupt vector are handled.

11. The computer-implemented method of claim 8 further comprising reading a first current priority level value from a first memory location and storing said first current priority level value in a second memory location prior to said batch-reading, said first current priority level tracking a priority level of an interrupt vector handled by said interrupt handling arrangement prior to said batch-reading.

12. The computer-implemented method of claim 11 further comprising restoring said first current priority level value to said first memory location after said working list is empty.

* * * * *

UNITED STATES PATENT AND TRADEMARK OFFICE
CERTIFICATE OF CORRECTION

| | | |
|---|---|---|
| PATENT NO. | : 7,149,831 B2 | Page 1 of 1 |
| APPLICATION NO. | : 10/950994 | |
| DATED | : December 12, 2006 | |
| INVENTOR(S) | : Christopher P. Ruemmler et al. | |

It is certified that error appears in the above-identified patent and that said Letters Patent is hereby corrected as shown below:

In column 5, line 10, delete "staring" and insert -- starting --, therefor.

In column 12, line 53, in Claim 8, delete "staring" and insert -- starting --, therefor.

Signed and Sealed this

Fourth Day of August, 2009

JOHN DOLL
*Acting Director of the United States Patent and Trademark Office*